March 9, 1937.   H. FUCHS   2,073,055
HAND BRAKE
Filed March 25, 1935
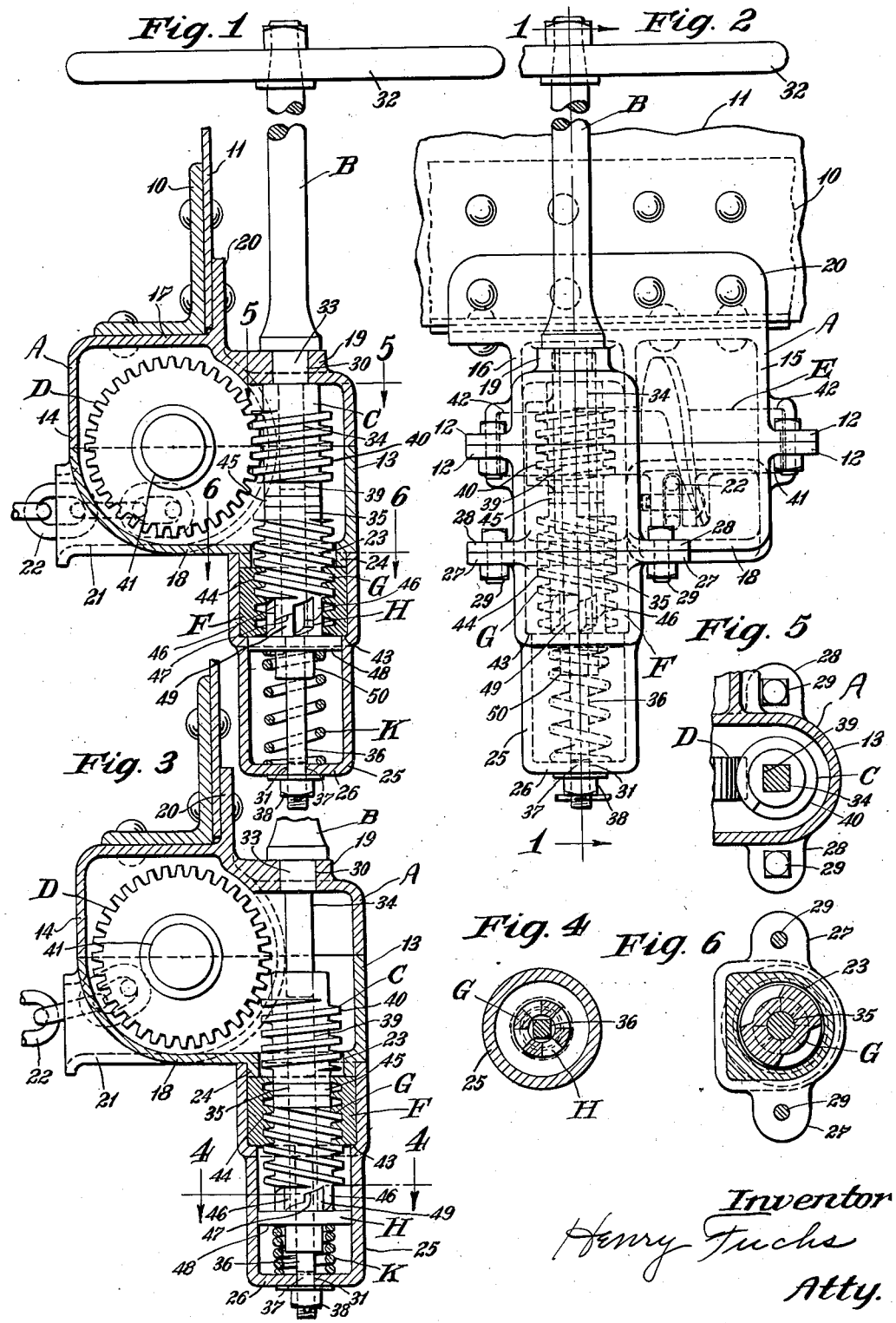
Inventor
Henry Fuchs
Atty.

Patented Mar. 9, 1937

2,073,055

UNITED STATES PATENT OFFICE 2,073,055

HAND BRAKE

Henry Fuchs, Chicago, Ill., assignor to W. H. Miner, Inc., Chicago, Ill., a corporation of Delaware Application March 25, 1935, Serial No. 12,788

20 Claims. (Cl. 74—505)

This invention relates to improvements in hand brakes.

One object of the invention is to provide a simple and efficient hand wheel operated brake mechanism of the worm gear driven type, wherein quick and complete release are obtained after a predetermined backing off of the brakes through disengagement of the worm gear members from each other by rotation of the hand wheel, the operation of the brakes being thus in complete control of the brakeman without removing his hand from the wheel.

Another object of the invention is to provide in a hand brake mechanism of the character described in the preceding paragraph, simple, efficient, and reliable positively acting means controlled by rotation of the hand wheel of the brake mechanism in reverse directions for respectively effecting disengagement of the worm gears from each other and effecting reengagement thereof with each other.

A more specific object of the invention is to provide a hand brake mechanism comprising a chain winding member actuated by cooperating worm and worm wheel members, wherein the worm is rotated by a rotary hand operated mechanism and is displaced axially to disengage the worm from the worm wheel and reengage the same therewith, while being rotated to produce proper operation of the brakes, and wherein said displacement of the worm member is effected through screw means adapted to be connected to and disconnected from said hand operated mechanism through means controlled by the rotation of said hand operated mechanism.

A still further object of the invention is to provide a mechanism of the character set forth in the preceding paragraph wherein the means for connecting the screw to, and disconnecting the same from, the rotary hand operated mechanism is in the form of cooperating clutch members which are automatically thrown into and out of operative engagement by rotation of the hand operated mechanism.

Other objects of the invention will more clearly appear from the description and claims hereinafter following.

In the drawing forming a part of this specification, Figure 1 is a vertical sectional view through the end of a railway car, illustrating my improved hand brake mechanism in connection therewith, the section through said mechanism corresponding substantially to the line 1—1 of Figure 2. Figure 2 is an elevational view of the structure shown in Figure 1. Figure 3 is a view similar to Figure 1, showing the parts in a different position, parts of the mechanism of said figure being broken away. Figure 4 is a horizontal sectional view, corresponding substantially to the offset line 4—4 of Figure 3. Figure 5 is a horizontal sectional view, partly broken away, corresponding substantially to the line 5—5 of Figure 1. Figure 6 is a horizontal sectional view, corresponding substantially to the line 6—6 of Figure 1.

In said drawing, 10 indicates the end sill of a railway car and 11 the end wall of said car. My improved hand brake mechanism, which is shown as mounted on the end of the car, comprises broadly a housing A; an operating shaft B; a worm element C; a worm wheel D; a chain winding drum E; a nut F; a screw G; a clutch member H; and a clutch spring K.

As most clearly shown in Figures 1, 2, and 3, the housing A is horizontally divided to provide top and bottom sections which have laterally projecting flanges 12—12 which are secured together by means of bolts, or similar fastening elements. The housing A has spaced front and rear walls 13 and 14, spaced side walls 15 and 16, a top wall 17, and a bottom wall 18. As most clearly shown in Figure 1, the top wall extends beneath the horizontal flange of the end sill 10 and is secured thereto by rivets, or any other similar fastening elements. Outwardly beyond the end sill 10 and the end wall 11 of the car, the top wall 17 is downwardly offset, as indicated at 19, said offset portion being thickened, as clearly shown in Figures 1 and 2. The top wall 17 is also provided with a transverse, vertically disposed securing flange 20 adjacent to said offset wall portion 19 for securing the housing to the vertical end wall of the car. As shown in Figure 1, rivets extending through the vertical flange of the end sill 10, the wall 11, and the flange 20, secure the latter to the end of the car. As shown in Figures 2 and 3, the bottom wall 18 of the housing is curved upwardly at the left hand end and merges with the rear wall 14. The curved section of the bottom wall 18 is provided with an extension 21 of sleevelike form which accommodates the brake chain 22. At the right hand end, as viewed in Figures 1 and 3, the bottom of the housing is provided with an opening 23, which is of the cross section shown in Figure 6. The opening 23 is surrounded by a depending flange 24 for a purpose hereinafter more fully set forth. The opening 23 of the housing is closed by a bottom section 25, which is in the form of a shell having the lower end closed by a wall 26. At the upper end, the shell 25 is provided with laterally extending flanges 27—27, which cooperate with similar flanges 28—28 on the bottom of the housing proper A. The shell 25 is fixed to the housing by bolts 29—29, which extend through the flanges 27—27 and 28—28. The thickened portion 19 of the top wall 17 of the housing A is provided with a vertical bearing opening 30 for the shaft B. The bottom wall 26 of the shell portion 25 of the housing is also provided with a bearing opening 31, which is in vertical alignment with the opening 30 and serves as a journal for the lower end of the shaft B.

The shaft B has a hand wheel 32 secured to the upper end thereof to provide means for rotating said shaft. The portion 33 of the shaft, which extends through the top wall of the housing A, is reduced in diameter, as shown, and is journaled in the bearing opening 30. Immediately below the section 33 of the shaft B, the shaft is provided with a square portion 34, which extends into the worm C. Below the section 34, the shaft is of cylindrical cross section, as indicated at 35, and this portion of the shaft extends through the screw G. Below the section 35, the shaft is square, as indicated at 36, said square portion being of smaller cross section than the cylindrical portion 35. The extreme lower end portion of the shaft is of round cross section, as indicated at 37, and is rotatably journaled in the bearing opening 31 of the shell 25. As will be evident upon reference to Figures 1 and 3, the shaft B is held against downward movement in the housing by means of the shouldered engagement of the enlarged upper portion of said shaft with the top wall section 19 of the housing A. In order to prevent upward movement of the shaft, the nut 38 is threaded on the lower end thereof and a washer is interposed between said nut and the bottom wall 26 of the shell 25.

The worm element C is of cylindrical cross section and has an axial opening 39 therethrough, which is of substantially square cross section so as to mount the worm for sliding movement on the square portion 34 of the shaft B. Between the ends thereof, the worm is provided with threads 40, which mesh with the teeth of the worm wheel D.

The worm wheel D and the drum E are preferably made integral and may be in the form of a casting having journal portions 41—41 at opposite ends thereof rotatably supported in suitable bearings 42—42 in the side walls 15 and 16 of the housing A. The inner link of the brake chain 22 is anchored to the chain winding drum E in the usual manner and is wound upon the drum when the latter is rotated in a left hand direction, as viewed in Figure 1. Rotation to effect winding movement of the chain drum E is effected through rotation of the worm C by means of the operating hand wheel 32 in a well-known manner. As shown in Figures 1 and 3, the threads 40 of the worm C are right hand so that rotation of the hand wheel 32 and the shaft B in a right hand direction will cause rotation of the chain winding drum in a left hand direction, as viewed in said figures.

The nut F is of the cross section shown in Figure 6, and is disposed within the upper part of the shell 25 and fits said upper part so that the nut F will be held against rotation. The upper end of the nut F abuts the lower face of the flange 24 of the housing A and has its lower end seated on a shoulder 43 formed in the upper part of the shell 25. As will be evident, the nut F is thus held against vertical movement, as well as against rotation. The nut is provided with internal left hand threads, which are adapted to cooperate with the threads of the screw G.

The screw G is in the form of a cylinder having the intermediate portion thereof screw threaded, as indicated at 44. The screw G is provided with an axial bore of circular cross section which receives the round section 35 of the shaft B, so that the shaft may rotate with respect to the screw G and the screw may slide vertically on said shaft. A thrust washer 45 is interposed between the upper end of the screw G and the bottom end of the worm element C. At the lower end, the screw member G is provided with a series of spaced clutch projections 46—46. Each clutch projection is provided with an inclined bottom face 47 for a purpose hereinafter pointed out, and the faces of the top walls of the openings between the clutch projections 46—46 are also similarly inclined.

The clutch member H comprises a disclike section 48, which is in the form of a circular flange of such a size as to engage the bottom face of the fixed nut F. The clutch member H has upwardly extending, spaced clutch projections 49—49 formed on the disk portion 48 thereof, which cooperate with the clutch projections 46—46 of the screw G. The top faces of the projections 49—49 are inclined so as to match the lower faces of the projections 46—46. The projections 46 and 49 are of such a width as to respectively fit within the openings between the clutch projections of the clutch member H and the screw G. At the lower side, the clutch member H is provided with a boss 50, which surrounds the square portion 36 of the shaft B. The clutch member H is provided with a vertical opening therethrough of square cross section and of such a size as to slidingly fit the square portion 36 of the shaft B. The clutch member H is yieldingly held in the raised position shown in Figure 1 by means of the spring K which is interposed between the bottom wall of the shell portion 25 and the lower face of the disc section 48 of the clutch member H. As will be evident upon reference to Figure 1, the clutch element H will ratchet over the clutch projections 46—46 of the screw G when the clutch is rotated in a right hand direction by means of the shaft B. At this time engagement of the projections 49—49 of the clutch H between the projections 46—46 of the screw G is prevented by the shouldered engagement of the clutch with the bottom end of said screw. However, when the shaft B is rotated in a left hand direction, thereby rotating the clutch member H in a like direction, the clutch projections 49—49 will engage the clutch projections 46—46 of the screw, thereby compelling the screw to rotate therewith and thread downwardly within the nut F from the position shown in Figure 1 to that shown in Figure 3. When the operating shaft is rotated in a reverse direction, assuming the parts to be in the position shown in Figure 3, the clutch projections 49—49 of the clutch member H being held in locked engagement with the clutch projections 46—46 of the screw G, as clearly shown in Figure 3, the screw will be compelled to rotate with the clutch in a right hand direction, thereby threading the screw upwardly in the nut F until the parts assume substantially the position shown in Figure 1. In this position, upward movement of the clutch member H is arrested, thereby withdrawing the clutch projections thereof from locked engagement with the clutch projections of the screw G and permitting ratcheting action of the clutch member H with respect to the screw G and allowing the screw to remain stationary.

In applying the brakes, the operation of my improved hand brake mechanism, assuming the parts to be in the position shown in Figure 1, is as follows: Upon rotation of the hand wheel 32 in a right hand direction, the worm C will be rotated therewith, thereby rotating the worm wheel D in a left hand direction and winding the chain 22 on the drum to apply the brakes. During this time, the screw G is stationary and takes the thrust of the worm C, the worm rotating on the thrust washer 45, which is located between the worm and the screw G. In releasing the brakes, the hand wheel 32 is rotated in a left hand direction, as viewed in Figure 1, thereby effecting rotation of the worm C in a like direction and causing rotation of the worm wheel and chain winding drum E in a right hand direction to effect unwinding of the chain from the drum. During this operation, the clutch member H will be rotated in a left hand direction with the shaft B. During the first part of the rotation of the clutch member H, the clutch projections 49 thereof will be brought into engagement with the depending clutch projections 46 of the screw, thereby effecting rotation of the screw in a left hand direction, as hereinbefore described. The screw will thus be lowered during the further rotation of the shaft B in a left hand direction, causing the worm C to be lowered therewith. As will be evident, the thrust exerted by means of the brake chain 22 through the worm wheel D will act in a downward direction on the worm C, thereby maintaining the worm seated on the screw G. During the described action, the brake will be backed off until the parts assume substantially the position shown in Figure 3, whereupon the worm C becomes completely disengaged from the teeth of the worm wheel D, permitting free rotation of the worm wheel and the chain winding drum E to effect complete release of the brakes. In again applying the brakes, when the parts have been left in the position shown in Figure 3, rotation of the hand wheel in a right hand direction will effect rotation of the shaft B and the clutch member H therewith, causing the screw G to be rotated in a right hand direction also and screwed upwardly into the nut F in the manner hereinbefore described, thereby raising the worm C and bringing the threads thereof into engagement with the worm wheel D and effecting rotation of the latter to wind the chain on the drum. The described action continues until the parts again assume the position shown in Figure 1, whereupon the clutch is released in the manner hereinbefore described and the tightening of the brakes proceeds by rotation of the worm C without any further movement of the nut F.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary winding element; of a worm wheel connected to said element for rotating the latter; a rotary worm engageable with the worm wheel for rotating the same; actuating means for rotating the worm; and means for positioning said worm to engage the same with the worm wheel and disengage the same therefrom, including a fixed nut member, a screw in threaded engagement with the nut member and mounted for rotary movement with respect to the worm, and means for effecting connection between the actuating means and screw for rotating the latter.

2. In a hand brake mechanism, the combination with a rotary winding element; of a worm wheel connected to said element for rotating the latter; a rotary worm engageable with the worm wheel for rotating the same; actuating means for rotating the worm; and means for positioning said worm to engage the worm with the worm wheel and disengage the same therefrom, including a fixed nut member, a screw in threaded engagement with the nut member and rotatable with respect to the worm, and means driven by said actuating means for rotating the screw.

3. In a hand brake mechanism, the combination with a rotary winding element; of a worm wheel connected to said element for rotating the latter; a rotary worm engageable with the worm wheel for rotating the same; actuating means for rotating the worm; a fixed nut member; a screw for positioning said worm to engage said worm wheel and be disengaged therefrom, said screw being in threaded engagement with the nut member and rotatable with respect to the worm, and being moved axially in reverse directions upon rotation thereof in reverse directions; and means controlled by rotation of the actuating means for effecting connection between the actuating means and screw for effecting rotation of the screw.

4. In a hand brake mechanism, the combination with a rotary winding element; of a worm wheel connected to said element for rotating the latter; a rotary worm engageable with the worm wheel for rotating the same; actuating means for rotating the worm; a fixed nut member; a screw for positioning said worm to engage said worm wheel and to be disengaged therefrom, said screw having threaded engagement with the nut member and mounted for rotation with respect to the worm; a rotary driving member operated by said actuating means; and cooperating clutch means on said screw and driving member.

5. In a hand brake mechanism, the combination with a rotary winding element; of a worm wheel connected to said element for rotating the latter; a rotary worm engageable with the worm wheel for rotating the same; actuating means for rotating the worm; a fixed nut member; a positioning screw for said worm rotatable with respect to the worm and in threaded engagement with the nut member for effecting engagement of the worm with the worm wheel and disengagement of said worm from said worm wheel; and clutch means for operatively connecting the screw to the actuating member for rotating said screw.

6. In a hand brake mechanism, the combination with a rotary winding element; of a worm wheel connected to said element for rotating the latter; a rotary worm engageable with the worm wheel for rotating the latter; rotary actuating means rotatable in reverse directions for rotating the worm in one direction to effect rotation of said element in winding direction and in a reverse direction to effect rotation of said element in unwinding direction; a fixed nut member; a screw rotatable with respect to the worm and in threaded engagement with the nut member for positioning the worm with respect to the worm wheel to respectively effect engagement of the worm with the worm wheel and disengagement of the worm from said worm wheel; a driving member rotatable with the actuating means; and cooperating clutch means on said screw and driving member for effecting driving connection between the screw and driving member when said actuating means is rotated in one direction and effecting disconnection of said screw and driving member when the actuating means is rotated in a reverse direction.

7. In a hand brake mechanism, the combination with a rotary winding element; of a worm wheel connected to the winding element for rotating the latter; a rotary actuating shaft; a worm mounted on the shaft for rotation therewith, said worm being longitudinally slidable on said shaft and engageable with the worm wheel; a fixed nut; a screw in threaded engagement with the nut, said screw having pushing engagement with the worm to effect longitudinal movement of said worm on said shaft; a driving member rotatable with said shaft and having sliding movement on said shaft; means for urging said driving member toward the screw; and cooperating clutch means on the driving member and screw.

8. In a hand brake mechanism, the combination with a rotary winding element; of a worm wheel connected to the winding element for rotating the latter; a rotary actuating shaft, said shaft being rotatable in reverse directions; a worm rotatable with said shaft and longitudinally slidable thereon, said worm being engageable with the worm wheel; a fixed nut; a screw in threaded engagement with the nut, one end of said screw abutting the worm and the other end of said screw having clutch projections thereon; a driving clutch member rotatable with said shaft and longitudinally slidable thereon, said clutch member having clutch projections engageable with the clutch projections of the screw; and yielding means for urging said driving member into engagement with the clutch projections of the screw.

9. In a hand brake mechanism, the combination with a rotary winding element; of a worm wheel connected to the winding element for rotating the latter; a rotary actuating shaft, said shaft being rotatable in reverse directions; a worm rotatable with said shaft and longitudinally slidable thereon, said worm being engageable with the worm wheel; a fixed nut; a screw in threaded engagement with the nut, said screw having pushing engagement with the worm to move the latter lengthwise of said shaft, said screw having clutch projections thereon, said clutch projections having inclined end faces; a driving clutch member rotatable with said shaft and longitudinally slidable thereon, said clutch member having clutch projections thereon engageable between the clutch projections of said screw for rotating the screw, the clutch projections of said clutch member having inclined end faces adapted to ratchet over the inclined faces of the projections of said screw; means for yieldingly pressing the clutch member into engagement with the clutch projections of the screw; and means for limiting movement of said clutch member in a direction toward said screw to provide ratcheting action of said clutch member with respect to the screw during rotation of said actuating shaft in brake tightening direction.

10. In a hand brake mechanism, the combination with a winding element rotatable about a horizontal axis; of a worm wheel connected to the winding element for rotating the latter; a rotary actuating shaft rotatable about a vertical axis; a fixed nut through which said shaft extends; a screw threaded in said nut, said screw surrounding said shaft and mounted on said shaft for longitudinal sliding and freely rotatable movement with respect to said shaft; a worm mounted on the shaft for rotation therewith, said worm being supported on said screw and freely slidable lengthwise of said shaft, said worm being engageable with the worm wheel; and clutch means rotatable with the shaft for operatively connecting the shaft to said screw.

11. In a hand brake mechanism, the combination with a winding element rotatable about a horizontal axis; of a worm wheel connected to the winding element for rotating the latter; a rotary actuating shaft rotatable about a vertical axis; a fixed nut through which said shaft extends; a screw threaded in said nut, said screw surrounding said shaft and mounted on said shaft for longitudinal sliding and free rotary movement with respect to said shaft; a worm mounted on the shaft for rotation therewith, said worm being supported on said screw and freely slidable lengthwise of said shaft, said worm being engageable with the worm wheel; a driving member on said shaft below said screw, said driving member being rotatable with the shaft and vertically slidable thereon; cooperating clutch means on said driving member and screw; and means for yieldingly holding said driving member in raised position.

12. In a hand brake mechanism, the combination with a winding element rotatable about a horizontal axis; of a worm wheel connected to the winding element for rotating the latter; a rotary actuating shaft rotatable about a vertical axis; a fixed nut through which said shaft extends; a screw threaded in said nut, said screw surrounding said shaft and being longitudinally, slidingly and freely rotatably mounted on said shaft; a worm mounted on the shaft for rotation therewith, said worm being supported on said screw and freely slidable lengthwise of said shaft, said worm being engageable with the worm wheel; a driving member on said shaft below said nut, said driving member being rotatable with the shaft and vertically slidable thereon; cooperating sets of ratchet teeth on said driving member and screw, said teeth of both the driving member and screw being spaced apart to provide clutch recesses between the teeth of each set to permit said sets of teeth to interlock; spring means for yieldingly supporting said driving member and holding the same engaged with the screw; stop means for limiting upward movement of the driving member in position to unlock said sets of ratchet teeth from each other and permit ratcheting action between said clutch member and screw during rotation of said shaft in brake tightening direction.

13. In a hand brake mechanism, the combination with a rotary winding element; of a worm wheel connected to said element for rotating the latter; a rotary worm having right threads engageable with the worm wheel for rotating the latter; actuating means for rotating the worm; a fixed left threaded nut; a left threaded screw engaging the threads of the nut, said screw having pushing engagement with the worm to move the latter axially when said screw is rotated, said screw and actuating means being relatively rotatable; and means for effecting rotation of the screw.

14. In a hand brake mechanism, the combination with a rotary winding element; of a worm wheel connected to said element for rotating the latter; a rotary worm having right threads engageable with the worm wheel for rotating the latter; actuating means for rotating the worm; a fixed left threaded nut; a left threaded screw engaging the threads of the nut, said screw having pushing engagement with the worm to move the latter axially when said screw is rotated, said screw and actuating means being relatively rotatable; and means rotated by said actuating means for effecting rotation of the screw.

15. In a hand brake mechanism, the combination with a rotary winding element; of a worm wheel connected to said element for rotating the latter; a rotary worm having right threads engageable with the worm wheel for rotating the latter; actuating means for rotating the worm; a fixed left threaded nut; a left threaded screw engaging the threads of the nut, said screw having pushing engagement with the worm to move the latter axially when said screw is rotated, said screw and actuating means being relatively rotatable; a rotary driving member rotatable with the actuating means; and clutch means for operatively connecting the driving member and screw.

16. In a hand brake mechanism, the combination with a rotary winding element; of a worm wheel connected to said element for rotating the latter; a rotary and axially slidable worm having right threads engageable with the worm wheel; rotary actuating means for rotating said worm in reverse directions; screw means for displacing said worm axially, said screw means including nut and screw members having cooperating left threads, one of said members being fixed and the other member being rotatable, said rotatable member being movable in an axial direction; a driving member actuated by said rotary actuating means; and clutch means for operatively connecting said driving member and the rotatable member of said screw means to effect rotation of the latter.

17. In a hand brake mechanism, the combination with a rotary winding element; of a worm wheel connected to said element for rotating the latter; a rotary and axially slidable worm having right threads engageable with the worm wheel; rotary actuating means for rotating said worm in reverse directions to respectively effect rotation of said element in winding and unwinding directions; screw means for displacing said worm axially in one direction to engage the same with the worm wheel and for positioning said worm in disengaged relation with respect to the worm wheel, said screw means including cooperating nut and screw members, one of said members being fixed and the other being rotatable and movable longitudinally in an axial direction; clutch means for operatively connecting said rotatable member of the screw means with said rotary actuating means; and means for effecting disengagement of said clutch means when the worm is in engagement with the worm wheel and the actuating means is rotated in brake tightening direction.

18. In a hand brake mechanism, the combination with a rotary winding element; of a worm wheel connected to said element for rotating the latter; a rotary and axially slidable worm having right threads engageable with the worm wheel; rotary actuating means for rotating said worm in reverse directions to respectively effect rotation of said element in winding and unwinding directions; screw means for positioning said worm to either engage the same with the worm wheel or disengage the same therefrom, said screw means including cooperating nut and screw members, one of said members being fixed and the other being rotatable and movable longitudinally in an axial direction; clutch means for operatively connecting said rotatable member of the screw means with the rotary actuating means; and means controlled by rotation of the actuating means for effecting engagement of said clutch means when the actuating means is rotated in brake releasing direction and while the worm is engaged with the worm wheel, and for effecting disengagement of the clutch means while the worm is engaged with the worm wheel and the actuating means is rotated in brake tightening direction.

19. In a hand brake mechanism, the combination with a winding element rotatable about a horizontal axis; of a worm wheel connected to said element for rotating the latter; a worm having right threads engageable with the worm wheel, said worm being rotatable about a vertical axis and also being vertically slidable; rotary actuating means for rotating said worm; screw means for positioning said worm with respect to the worm wheel to either engage the worm with the worm wheel or disengage the same therefrom, said screw means including nut and screw members having cooperating left threads, one of said members being fixed and the other of said members being rotatable and axially movable and supporting said worm; and means for operatively connecting said rotary actuating means and the rotary member of said screw means for rotating the latter.

20. In a hand brake mechanism, the combination with a winding element; of worm means for rotating said winding element, including a worm wheel and a cooperating worm, said worm being rotatable about a vertical axis and having right threads engageable with the worm wheel; a rotary operating shaft for the worm, said shaft being rotatable about a vertical axis and having the worm slidably mounted thereon, said worm being rotatable with said shaft; a fixed nut having left threads; a screw member threaded in the nut and supporting said worm, said screw member being rotatable on said shaft about a vertical axis; and automatically operated clutch means controlled by rotation of said shaft for operatively connecting the screw to said shaft for rotation with the latter.

HENRY FUCHS.